UNITED STATES PATENT OFFICE.

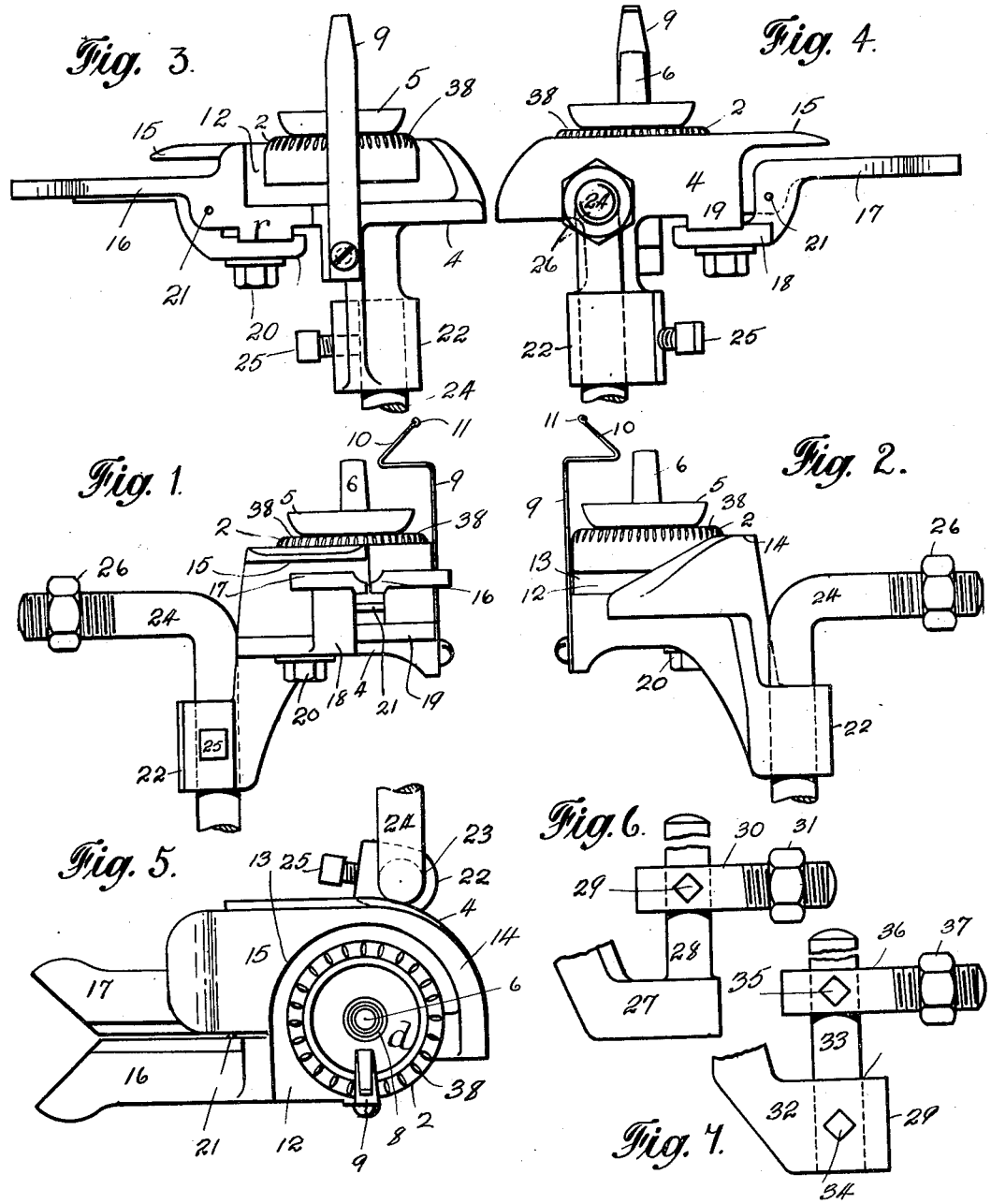

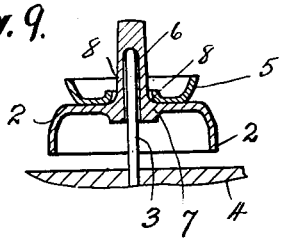
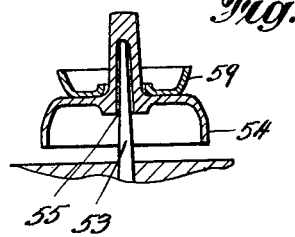
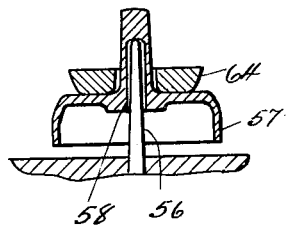
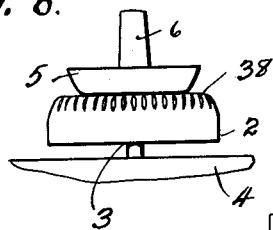
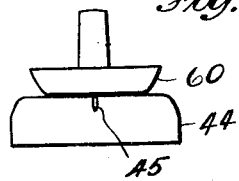
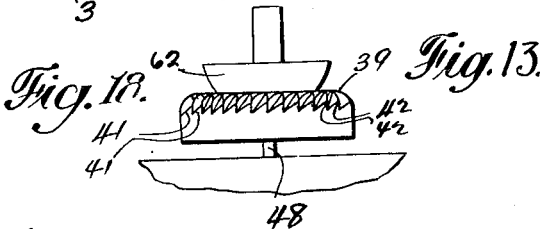
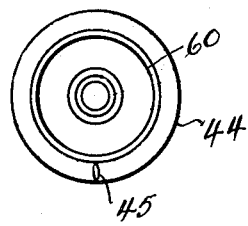
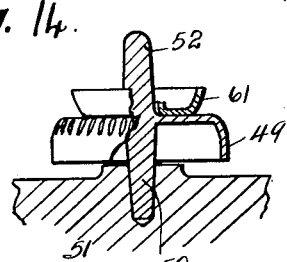
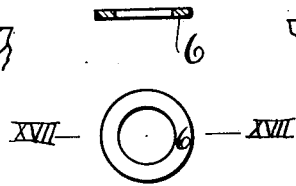
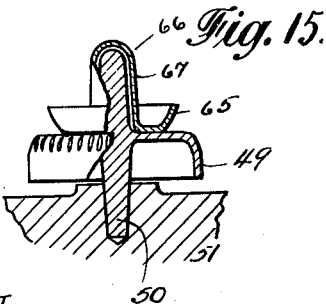
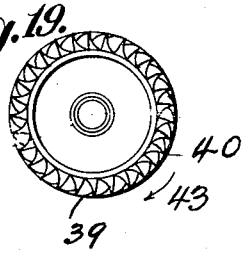

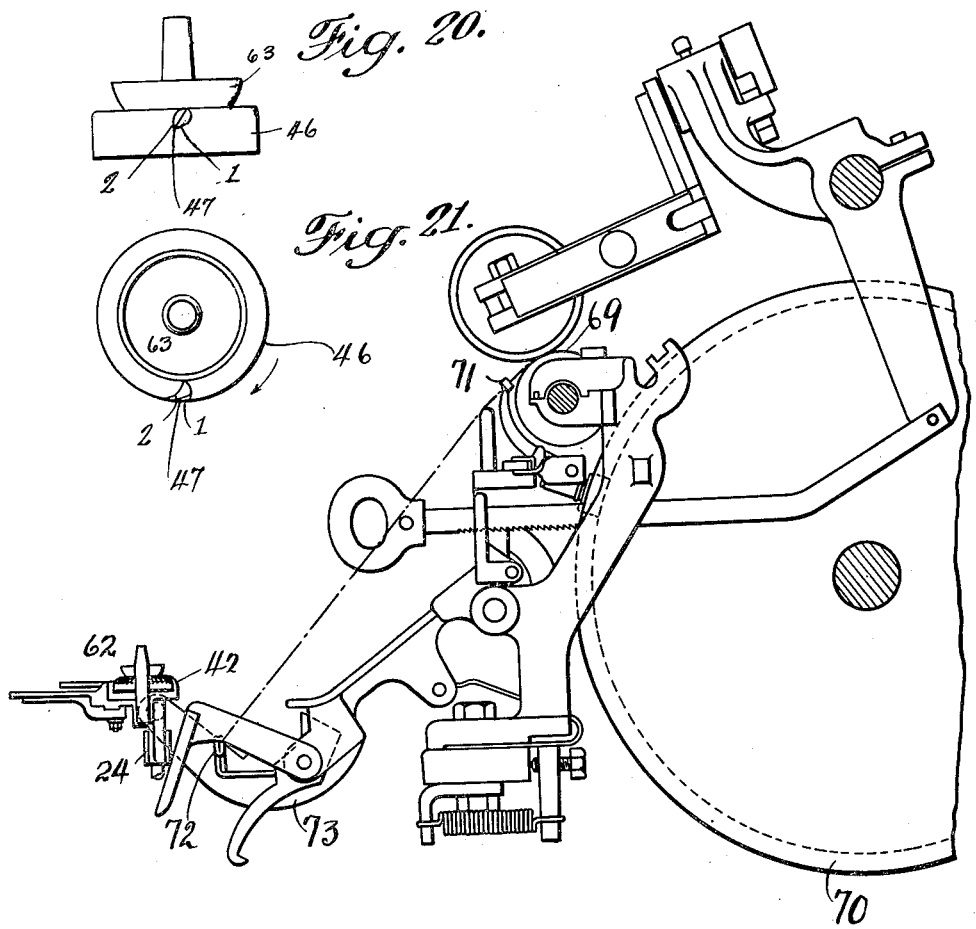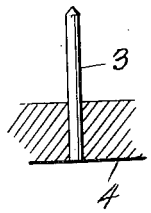

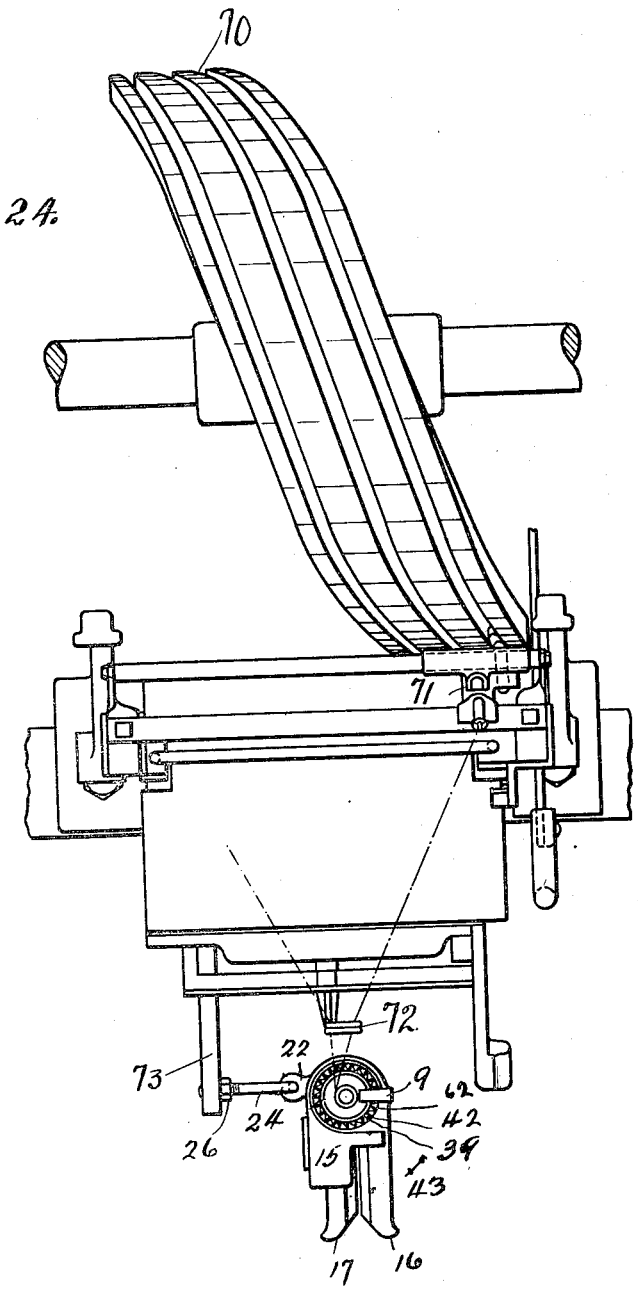

FRANK ASHWORTH HOLT, OF ROCHDALE, AND GRINDROD KERSHAW, OF WHITWORTH, ENGLAND, ASSIGNORS, BY MESNE ASSIGNMENTS, TO FOSTER MACHINE COMPANY, OF WESTFIELD, MASSACHUSETTS, A CORPORATION OF MASSACHUSETTS.

YARN-TENSION DEVICE.

1,353,476.  Specification of Letters Patent.  Patented Sept. 21, 1920.

Application filed November 6, 1917. Serial No. 200,570.

*To all whom it may concern:*

Be it known that we, FRANK ASHWORTH HOLT, machine maker, a subject of the King of the United Kingdom of Great Britain and Ireland and resident of Noon Sun House, Whitworth Road, Rochdale, in the county of Lancaster, England, and GRINDROD KERSHAW, machine maker, a subject of the King of the United Kingdom of Great Britain and Ireland, and resident of 62 Market street, Whitworth, in the county of Lancaster, England, have invented new and useful Improvements in Yarn-Tension Devices, of which the following is a specification.

This invention relates to the kind of device for applying drag or tension to or cleaning yarn, thread, cord, twine or the like in which the material to be subjected to tension and cleaned is made to pass between and in contact with and to revolve disks or the like.

This invention consists in improvements rendering devices of the said kind embodying them more efficient and convenient than devices of that kind heretofore provided in enabling yarn, thread, cord, twine or the like to be drawn between the disks or the like at any speed requisite under proper drag or tension without being subjected to excessive tension or strain, and in other improvements to be described hereinafter and pointed out in the claims.

Hereinafter for simplicity in the description and claims the word "yarn" will be used instead of "yarn, thread, cord, twine or the like," the word "disk" will be used to mean a disk, cup or other like part to be revolved by contact with yarn, thread, cord, twine or the like and "yarn engaging means" will be used to mean engaging means against which yarn, thread, cord, twine or the like may arrive and engage.

For simplicity, improvements applicable in or with a device of the said kind according to this invention may be indicated as follows:

A disk is provided which presents a marginal part to deflect and to be subject to pressure of yarn and has symmetrical or unsymmetrical yarn engaging means in that marginal part against which yarn may arrive and engage so as to check or hinder the revolution of the disk and so to prevent it from revolving with excessive speed. In the case of unsymmetrical yarn engaging means the yarn acts with the disk after the manner of a pawl and ratchet, in turning the disk in one direction, preventing it from turning in the opposite direction or hindering it more completely against turning in one direction than against turning in the opposite direction according to the circumstances and needs of use. A supporting base and a rod receiving or formed with the supporting base and secured in a fixed part are provided so that the supporting base, being adjusted along or in the direction of the length of the rod, will enable the disks of the device to be adjusted in the direction of their axes to vary the intensity of pressure and bearing of yarn against the one disk. A resilient guard arm is provided to prevent the disks from being accidentally displaced from the device while allowing them easily to be removed when removal may be necessary or desirable and to insure that yarn shall be led in the proper direction between the disks.

To illustrate this invention, the accompanying drawings show, by way of example, one form of tension applying or yarn cleaning device, disks, and a resilient guard arm provided according to this invention and a tension applying or yarn cleaning device applied in a machine for the disk upon which yarn bears to work with the yarn after the manner of a pawl and ratchet according to this invention.

Figures 1, 2, 3, 4 and 5 are, respectively, a front elevation, rear elevation, right side view, left side view, a plan of the tension device, one form of disk and one means of support and adjustment. Figs. 6 and 7 are rear elevations of other means of support and adjustment. Fig. 8 is a side elevation of tension disks and part of the pivot of the device shown in Figs. 1 to 5. Figs. 9, 10, 11, are vertical sections of tension disks and supporting pivots. Fig. 12 is a side elevation of other disks and part of the pivot supporting them, and Fig. 13 is a plan of these disks.

Figs. 14 and 15 are vertical sections of other disks partly in side elevation. Fig. 16 is a plan of weight, and Fig. 17 a vertical section on the plane indicated by the line XVII—XVII of Fig. 16. Fig. 18 is a side elevation partly in vertical section of other disks and the pivot supporting them, and Fig. 19 a plan of these disks. Fig. 20 is a side elevation and Fig. 21 a plan of other disks. Fig. 22 is a vertical section partly in side elevation showing the pivot for a disk. Figs. 23 and 24 are, respectively, a side elevation and plan of part of a winding machine with a tension applying or yarn cleaning device applied in it.

In the device illustrated in Figs. 1 and 2 3, 4 and 5 a disk 2 is mounted around and supported by the apex of a fixed pivot 3 shown in Figs. 8 and 9 and carried by a supporting base 4 and is provided with an annular disk 5 mounted upon it so that the yarn may be led between the disks 2 and 5. The pivot 3 may be made adjustable lengthwise in the supporting base 4 and held therein by any convenient means as by being made to fit tightly in the hole in which it is inserted.

The disk 2 is provided with a central upwardly projecting sleeve 6 within which is formed a hole 7 to receive the pivot 3 and made a little larger in diameter than the pivot 3 so that the disk 2 may wabble or swing in being turned on the pivot 3. Outwardly the sleeve 6 is made conical and the disk 5 which is made to surround the sleeve 6 is formed with a central hole 8 a little larger than the part of the sleeve 6 surrounded by it.

A resilient guard arm 9 is secured to the side of the supporting base 4 and made ordinarily to extend laterally over the edges of the disks 2 5 nearly to the sleeve 6 so as to prevent the disk 5 from being thrown off or accidentally removed from the disk 2 and the disk 2 from being removed accidentally from the pivot 3. If the arm 9 be pressed back the disk 5 may be removed from the disk 2 and the disk 2 may be removed from the pivot 3 either for cleaning of the surfaces which the disks present to one another or for any other purpose.

The arm 9 is furnished with an inclined extension, 10 ending in a curl 11 so that it may afford a convenient place to which a person may apply a thumb or finger to press back the arm 9. The extension 10 serves also as a guide to insure that yarn when being threaded between the disks 2, 5 shall be led in the proper position or direction between them.

The disk 2 is situate in a recess 12 formed in the supporting base 4 so that the walls 13, 14 of the recess 12 will prevent yarn from being passed accidentally beneath the disk 2. The recess 12 is open at one side and the wall 14 is made at one end to slope down to the bottom of the recess 12 so that there is space between the wall 14 and the guard finger 9 for yarn to pass upward to or downward from the surface of the disk 2, according as the apparatus may be applied for use. The upper surface of the supporting base 4 is formed so as in use to be lower than the upper surface of the disk 2 for yarn to pass to or from the upper surface of the disk 2 at one side without touching the upper surface of the supporting base 4. The supporting base 4 is formed with a guide arm 15 and also with one arm 16 of a clearer. The other arm 17 of the clearer is adjustable upon and secured to the supporting base 4 in any suitable manner, being in the case illustrated formed on a block 18 adjustable upon a slide way 19 formed on the supporting base 4. A set screw 20 passed through a slot in the block 18 and screwed into the part 4 enables the block 18 to be secured in position after adjustment. A guide pin 21 is fixed in the supporting base 4 and extends into a hole formed in the block 18 so as to form a guide for yarn and to limit the distance to which yarn may pass into the nick between the clearer arms 16, 17. The supporting base 4 may be mounted in any suitable way in the machine or apparatus in which the tension device is to be applied. Figs. 1, 2, 3, 4 and 5 show the supporting base 4 as formed with an arm 22 having a hole 23 approximately parallel to the axes of the disks 2 5 to receive a supporting rod 24 with a set screw 25 screwed into it, and the supporting rod 24 is shown as formed with two arms at right angles one vertical and cylindrical to receive the arm 22 of the base 4 and the other horizontal and formed with a screw thread and provided with a lock nut 26 so that it may be screwed into and made fast in any suitable part of the machine or apparatus to which the tension disk is to be applied, as for example in the manner illustrated in Figs. 23 and 24. The rod 24 enables the supporting base 4 to be adjusted in the direction of the axes of the disks and secured in position in order that the upper surface of the lower disk may be placed at any required higher or lower position in or on the machine or apparatus to which the device is to be applied for the inclination of yarn relatively to the disks to be adjusted.

Supporting bases and rods on or by which they may be mounted or supported so as to be adjustable in the direction of the axes of the disks by movement along or in the direction of the length of such rods or parts of them may also be contrived in other ways. For example, Fig. 6 shows a part of a supporting base 27 furnished with a vertical rod 28 made to pass through and adjustable and secured by a set screw 29 in a hole in an arm 30. The arm 30 is adapted to be screwed and made fast by a lock nut 31 in any suitable part of a machine or apparatus. Fig. 7 shows as another example a part of a supporting base 32 furnished with a vertical rod 33 secured in it by a set screw 34 and passed through and adjustable and secured by a set screw 35 in a hole in an arm 36 itself adapted to be screwed and made fast by a lock nut 37 in any suitable part of a machine or apparatus.

Instead of being supported on or by rods enabling them to be adjusted in the direction of the axes of the disks, tension devices comprising disks with means for engaging yarn may be mounted adjustably or otherwise in any convenient manner in or on machines or apparatus to which they may be applied.

According to this invention the disk which deflects yarn led through the tension device is furnished with yarn engaging means against which the yarn may arrive and become engaged with the disk in the marginal part which deflects and receives the pressure of yarn.

The said part of the disk is furnished with yarn engaging means of unsymmetrical form in any case in which it is required that the yarn engaging means shall coöperate with the yarn after the manner of a ratchet and pawl.

Provision may be made for the engagement of the yarn with the disk to be of any intensity or firmness requisite in any case by any surface which an engaging means provided presents to yarn arriving against it being made more or less steep or abruptly inclined throughout or in part, relatively to the direction in which yarn arriving against it bears upon it. In this way provision may be made for disengagement of yarn from the engaging means by the yarn being pulled over or across it to be as easy or as difficult or impossible as may be necessary in any case. The surface presented by an engaging means to yarn arriving against it may be of any form suitable in any case for example plane or curved.

In the cases illustrated in the accompanying drawings the marginal parts of the disks against which the yarn passing through the tension bears in consequence of being deflected thereby is made crenate so that the yarn being dragged across or against the crenate edge shoulder or margin of the disk and entering a notch or depression will engage more or less sharply with the surface against which it arrives after reaching the bottom of the notch or depression.

In the case illustrated in Figs. 1, 2, 3, 4 and 5 and 8, notches or depressions 38 shown as hollows with curved walls are formed around the marginal part of the disk 2 in such position that yarn passing from the disk 2 to a yarn guide or from a yarn guide to the disk 2 will enter a notch or depression 38 coming beneath it as yarn being drawn in contact with the disk 2 causes it to revolve. The yarn engaging with the notches or depressions 38 must be lifted therefrom by the revolution of the disk 2 and consequently the revolution of the disk 2 will receive some check or hindrance every time yarn enters and has to be lifted out of a notch or depression 38. According as yarn is made to incline more steeply downward relatively to a plane transverse to the axis of the disk 2 in passing away from the crenate edge or more steeply upward relatively to such a plane in passing toward the crenate edge, the engagement of the yarn with the notches or depressions 38 is made more intense and a greater check or hindrance will be opposed by the disengagement of the yarn from the notches or depressions 38 to the revolution of the disk 2. The inclination of the yarn in passing to or from the crenate edge of the disk 2 may be made greater or less by adjustment of the position of the disk 2 and most conveniently by the disk 2 being placed higher or lower relatively to the parts which guide yarn on the way to or from or to and from it. The adjustment of the position of the disk 2 may be made once for always in the construction or application of the device but most advantageously the device is made adjustable in the direction of the axes of the disks in or on the machine or apparatus to which it is applied by the supporting base being made adjustable in the direction of the axes of the disks by the use of the means described herein already in reference to Figs. 1, 2, 3, 4, 5, 6, and 7 in construction or by the adjustment of the position of the device.

In the case illustrated in Figs. 18, and 19, notches or depressions 39 of unsymmetrical form are formed around the marginal part of the disk 40 so that the yarn engaging parts formed by the walls 41, 42 of such notches or depressions 39 are also of unsymmetrical form. The walls 41, 42 are shown as formed of plane surfaces respectively inclined and approximately vertical when the axis of the disk 40 is vertical. As the notches or depressions 39 are of unsymmetrical form the steeper sides 41 of such notches or depressions 39 will afford a firmer engagement to yarn arriving against them than the less steep sides 42 so that while it is impossible or very difficult for yarn to be pulled or dragged past or over the steeper sides 41 of the notches or depressions 39 it is much less difficult for yarn to be pulled or dragged over the less steep sides 42. Thus according to the circumstances in which the disk 40 is used the yarn may be made to turn the disk 40 in one direction, namely that indicated by the arrow 43 or to prevent it from turning in the opposite direction or to hinder it more completely against turning in one direction than against turning in the opposite direction. According as yarn is made to incline more steeply downward in passing away from the crenate edge of the disk 40 or more steeply upward in passing toward it, the engagement of the yarn with the notches or depressions 39 is made more intense and a greater check or hindrance will be opposed by disengagement of the yarn from the notches or depressions 39 to the revolution of the disk 40. Consequently according to the circumstances of use the yarn will be enabled to exert a greater hindrance to the disk 40 in turning in the direction opposite to that indicated by the arrow 43 rather than in the direction indicated by the arrow 43 or to exert a greater influence in preventing the disk 40 from being turned in the direction opposite to that indicated by the arrow 43 or to exert a greater influence in turning the disk 40 in the direction indicated by the arrow 43.

Figs. 12 and 13 show a disk 40 with a single notch or recess 45 in the edge of the surface presented by it in use to yarn but otherwise acting similarly to that shown in Figs. 1, 2, 3, 4, 5 and 8 except in that the checks or hindrances to revolution are less frequent in proportion to the turns of the disk 44. Similarly Figs. 20 and 21 show a disk 46 with a single notch or recess 47 in the edge of the surface presented by it in use to yarn but otherwise similar to that shown in Figs. 18 and 19, except in that the checks or hindrances to revolution or as the case may be, opportunities for yarn to turn it are less frequent in proportion to the turns of the disk 46.

When the movement of a yarn from side to side is to be used as an important, the principal or the only means for turning a tension disk, the tension disk is formed with unsymmetrical notches or other unsymmetrical engaging parts at a pitch or distance between like parts less than the extent of the movement of the yarn from side to side at the part in contact with the disk in order that the yarn may engage with different notches or engaging means in successive movements in one direction.

Disks provided with yarn engaging parts according to this invention may be formed and supported for use in any of the different ways, convenient in different cases. By way of example Figs. 1, 2, 3, 4, 5, 8, 9, 10, 11, 12 and 13 and Figs. 18, 19, 20, and 21, show disks 2, 40, 46 supported on the apices of pivots 3, 48 and Figs. 14 and 15, show disks 49 which are formed with downwardly projecting pivots 50 adapted to revolve in holes formed in supporting bases 51. The disks 49, 49* shown in Figs. 14 and 15 are formed also with upwardly extending projections 52, 67 respectively to serve the function of the sleeves 6 hereinbefore described in keeping the upper disks on the disks 49, 49*. The yarn engaging parts of the disks 49, 49* shown in Figs. 14 and 15 are like those of the disks shown in Figs. 1, 2, 3, 4, 5, 6, 8, 12 and 13. Fig. 9 shows a pivot 3 substantially cylindrical having upon it a disk 2 with a cylindrical hole 7 a little larger than the pivot 3. Fig. 10 shows a tapered pivot 53 having upon it a disk 54 with a tapered hole 55 a little larger than the pivot 53 and Fig. 11 shows a tapered pivot 56 having upon it a disk 57 with a cylindrical hole 58 a little larger than the pivot 56 at the part surrounded by the entrance to the hole 58.

Disks provided with yarn engaging parts according to this invention may be used with upper disks of any of the forms which can be used in devices of the kind aforesaid. For example Figs. 1, 2, 3, 4, 5, 8, 9, 10, 12, 13, 14, 18, 19, 20, and 21, show disks 54, 44, 49, 40 and 46 used with upper disks 5, 59, 60, 61, 62 and 63 of annular cup shaped form. Fig. 11 shows a disk 57 used with an upper disk 64 of annular solid form and Fig. 15 shows a disk 49 which is used with an upper disk 5 formed with a sleeve 6 to surround loosely the upwardly extending projection 67 of the disk 49* to which it is applied.

When cup shaped or provided with upwardly extending projections or sleeves, the upper disks 5, 59, 60, 61, 62, 63 and 65 used with disks 2, 54, 44, 49, 40, 46 and 49* provided with yarn engaging parts according to this invention may be furnished with removable weights 68 for example such as are shown in Figs. 16, 17 and for adjusting the pressure to be applied to yarn passing between the disks 2, 54, 44, 49, 40, 46 and 49* and the upper disks 5, 59, 60, 61, 62, 63, and 65 used with them.

Disks provided with yarn engaging parts according to this invention may be applied with their axes in any suitable position in machines or apparatus of any kind in which it is requisite to apply drag or tension to yarn being wound. For example Figs. 23 and 24 illustrate the application of a disk 42 provided with yarn engaging devices according to this invention in a yarn winding machine constructed according to the inventions described in the specification of Letters Patent No. 1,215,025 dated February 6th 1917 and the specification of application filed November 10th 1916 Serial Number 130,552. In this machine yarn is wound into yarn packages by the friction of a drive roll 69 and in order to guide the yarn to and fro as it is wound a revolving cam 70 is made to work a yarn guide 71 to which yarn is led from the tension disks 42, 62 beneath the hook 72 of a mechanism for stopping the winding should the yarn break or come to an end. In Figs. 23 and 24 the rod 24 is shown secured in an arm 73 of the mechanism so as to support the tension device.

Figs. 23 and 24 also illustrate how the movement of a yarn from side to side in its passage to a body upon which it is being wound is used as a means for turning a disk of a tension device used in applying drag or tension to such yarn. Figs. 23 and 24 show a disk 42 provided with unsymmetrical yarn engaging means similar to that shown in Figs. 18 and 19. In Figs. 23 and 24 it is shown that the yarn being wound passes from the disk 42 of the tension device to the hook 72 and thence to the guide 71 moved to and fro in guiding the yarn to the yarn package. The hook 72 presents to yarn led through it a straight bar of length sufficient to allow the yarn to be moved from side to side in the hook 72 through an angle about its place of contact with the central sleeve of the disk 42 equal to a large part of the horizontal projection of the angle subtended about that point by the stroke or extent of traverse of the yarn guide 71. The movement of the yarn guide 71 consequently causes the yarn between the place of contact between the yarn and the sleeve to swing to and fro and in engaging parts of the disk 42 to turn it or to tend to turn it step by step always in the direction indicated by the arrow 43 after the manner of a pawl engaging a ratchet wheel so that even though the friction of the yarn may not turn the disk 42 or may not turn it with sufficient speed or certainty, the revolution of the disk 42 necessary for it to be kept clean is insured.

What we do claim as our invention and desire to secure by Letters Patent is:—

1. In a tension device of the character described, a revoluble disk arranged to present to yarn led through the tension device a marginal part to deflect and to be subject to pressure of yarn, and having yarn engaging means of unsymmetrical form in that marginal part.

2. In a tension device of the character described, a revoluble disk arranged to present to yarn led through the tension device a marginal part to deflect and to be subject to pressure of yarn, said disk being crenate in that marginal part.

3. In a tension device of the character described, a revoluble disk unsymmetrically crenate in a marginal part subject to the pressure of yarn led through the tension device.

4. A resilient guard arm for a tension device of the character described comprising a part to project over the edges of the disks and an inclined extension.

5. A tension device of the character described, comprising two revoluble disks, one presenting to yarn led through the tension device a marginal part to deflect and to be subject to the pressure of yarn and having yarn engaging means of unsymmetrical form in that marginal part, a second disk supported on the first to press upon yarn between them, and a supporting base for the disks.

6. A tension device of the character described comprising two revoluble disks one crenate in a marginal part subject to the pressure of yarn led through the tension device and a second disk supported on the first to press upon yarn between them and a supporting base for the disks.

7. A tension device of the character described comprising two revoluble disks one unsymmetrically crenate in a marginal part subject to the pressure of yarn led through the tension device and a second disk supported on the first to press upon yarn between them and a supporting base for the disks.

8. A tension device of the character described comprising two disks one presenting yarn engaging means at a marginal part subject to the pressure of yarn led through the tension device, and presenting an upwardly extending sleeve and a second disk mounted around the upwardly directed sleeve of the first to press upon yarn between them.

In testimony that we claim the foregoing as our invention, we have signed our names this twelfth day of October, 1917.

FRANK ASHWORTH HOLT.
GRINDROD KERSHAW.